(12) United States Patent
Qian et al.

(10) Patent No.: US 12,360,565 B2
(45) Date of Patent: Jul. 15, 2025

(54) DISPLAY SUBSTRATE, MANUFACTURING METHOD THEREOF, AND DISPLAY DEVICE

(71) Applicant: BOE Technology Group Co., Ltd., Beijing (CN)

(72) Inventors: Yuhan Qian, Beijing (CN); Libin Liu, Beijing (CN); Long Han, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 562 days.

(21) Appl. No.: 17/782,770

(22) PCT Filed: Apr. 21, 2021

(86) PCT No.: PCT/CN2021/088645
§ 371 (c)(1),
(2) Date: Jun. 6, 2022

(87) PCT Pub. No.: WO2021/213430
PCT Pub. Date: Oct. 28, 2021

(65) Prior Publication Data
US 2023/0004190 A1 Jan. 5, 2023

(30) Foreign Application Priority Data

Apr. 23, 2020 (CN) .......................... 202010326326.9

(51) Int. Cl.
*G09G 5/00* (2006.01)
*G06F 1/16* (2006.01)

(52) U.S. Cl.
CPC ................................ *G06F 1/1652* (2013.01)

(58) Field of Classification Search
CPC ........ G09F 9/301; G09F 9/302; G06F 1/1652; G02F 1/133305; H10K 77/111; H04M 1/0269
See application file for complete search history.

(56) References Cited

U.S. PATENT DOCUMENTS 11,074,841 B2 * 7/2021 Gao .......................... G09G 3/03
11,158,686 B2 * 10/2021 Lee ........................ G06F 3/0412
(Continued)

FOREIGN PATENT DOCUMENTS

CN 1395119 A 2/2003
CN 101964162 A 2/2011
(Continued)

OTHER PUBLICATIONS

CN 202010326326.9 first office action.
PCT/CN2021/088645 international search report and written opinion.

*Primary Examiner* — Joe H Cheng
(74) *Attorney, Agent, or Firm* — IPro, PLLC

(57) ABSTRACT

A display substrate, a manufacturing method thereof, and a display device are provided. The display substrate includes: a non-stretchable display region and a stretchable display region. The stretchable display region includes multiple island regions in an array and separated from each other, and multiple bridge regions connecting adjacent island regions, a pixel unit is arranged on each of the island regions, the pixel unit includes at least one pixel, and a signal wire electrically connecting the pixels is arranged on each bridge region. A pixel pitch between the pixels in the pixel unit in a stretching direction is a reference pitch $P_0$, a pitch between two adjacent pixel units in the stretching direction is a first pitch $P_1$, and the first pitch $P_1$ is less than the reference pitch $P_0$.

20 Claims, 3 Drawing Sheets

(56) References Cited

U.S. PATENT DOCUMENTS

| | | |
|---|---|---|
| 2003/0007033 A1 | 1/2003 | Ito et al. |
| 2013/0169907 A1 | 7/2013 | Wang et al. |
| 2014/0231763 A1 | 8/2014 | Kim |
| 2014/0361262 A1 | 12/2014 | Kim |
| 2016/0055783 A1 | 2/2016 | Lee et al. |
| 2016/0097950 A1 | 4/2016 | Chang et al. |
| 2016/0253969 A1 | 9/2016 | Chen et al. |
| 2017/0133449 A1* | 5/2017 | Kim ................ H10K 59/353 |
| 2017/0227805 A1* | 8/2017 | Chong ............ G02F 1/136286 |
| 2017/0229523 A1 | 8/2017 | Du |
| 2017/0357113 A1 | 12/2017 | Yamazaki et al. |
| 2019/0107911 A1 | 4/2019 | Zhai |
| 2019/0245164 A1 | 8/2019 | Zou |
| 2019/0250450 A1 | 8/2019 | Li |
| 2020/0006684 A1 | 1/2020 | Liu et al. |
| 2020/0066809 A1 | 2/2020 | Liu |
| 2020/0357325 A1 | 11/2020 | Zhao et al. |
| 2021/0013434 A1 | 1/2021 | Cao et al. |
| 2021/0376011 A1 | 12/2021 | Liu et al. |

FOREIGN PATENT DOCUMENTS

| | | | | |
|---|---|---|---|---|
| CN | 102540537 A | | 7/2012 | |
| CN | 104035258 A | | 9/2014 | |
| CN | 104241295 A | | 12/2014 | |
| CN | 104505004 A | | 4/2015 | |
| CN | 106952580 A | | 7/2017 | |
| CN | 108062920 A | | 5/2018 | |
| CN | 108230923 A | | 6/2018 | |
| CN | 108345152 A | | 7/2018 | |
| CN | 108364983 A | | 8/2018 | |
| CN | 109166866 A | | 1/2019 | |
| CN | 109448575 A | | 3/2019 | |
| CN | 109559649 A | | 4/2019 | |
| CN | 109599402 A | | 4/2019 | |
| CN | 110275355 A | | 9/2019 | |
| CN | 110277424 A | | 9/2019 | |
| CN | 110379836 A | | 10/2019 | |
| CN | 110634937 A | | 12/2019 | |
| CN | 110660331 A | | 1/2020 | |
| CN | 110993673 A | | 4/2020 | |
| CN | 111489645 A | | 8/2020 | |
| CN | 112002234 A | * | 11/2020 | ............ G09F 9/301 |
| CN | 112002237 A | * | 11/2020 | ............ G09F 9/301 |

\* cited by examiner

DISPLAY SUBSTRATE, MANUFACTURING METHOD THEREOF, AND DISPLAY DEVICE

CROSS-REFERENCE TO RELATED APPLICATIONS

This application is the U.S. national phase of PCT Application No. PCT/CN2021/088645 filed on Apr. 21, 2021, which claims priority to Chinese Patent Application No. 202010326326.9 filed in China on Apr. 23, 2020, which are incorporated herein by reference in their entirety.

TECHNICAL FIELD

The present disclosure relates to the technical field of display, and particularly to a display substrate, a manufacturing method thereof, and a display device.

BACKGROUND

Currently, flexible display devices develop from being variable in two dimensions to being variable in three dimensions. In order to increase the amount of deformability of a flexible display device, a flexible substrate is usually provided with a set of openings and it is divided into island regions where pixels are located and bridge regions where connecting lines are located, so that the display device has property of stretchability and deformability. The pixels are arranged on the island regions, and signal wires are arranged on the bridge regions, and when an external force is applied, the deformation mainly occurs in the bridge regions, and the pixels in the island regions basically maintain their shapes.

A display screen of the flexible display device includes a non-stretchable display region and a stretchable display region. Compared with the pixel design of the non-stretchable display region, pixels in the stretchable display region are designed as an extension of pixels in the non-stretchable display region since there is a difference in deformation amounts of the stretchable display region and the non-stretchable display region. For example, it may be formed by removing a part of the pixels on the basis of the pixel design of the non-stretchable display region. For example, after the pixels at the corresponding openings are removed in the pixel arrangement of the non-stretchable display region, the pixel arrangement of the stretchable display region is formed.

Therefore, when the stretchable display region is not subjected to stretching deformation, the pixel distribution thereof is uniform and the display brightness is uniform; however, when stretching deformation occurs, uniformity of the pixel distribution is broken and the pixel density of the stretchable display region decreases, which results in a decrease in the brightness of the stretchable display region, thereby causing the luminous brightness of the display panel of the entire stretchable display region to differ from the luminous brightness of the non-stretchable display region.

SUMMARY

The technical solutions provided by the present disclosure are as follows.

A display substrate is provided, including a non-stretchable display region and a stretchable display region;

the stretchable display region includes multiple island regions in an array and separated from each other, and multiple bridge regions connecting adjacent island regions, a pixel unit is arranged on each of the multiple island regions, the pixel unit includes at least one pixel, and a signal wire electrically connecting the pixels is arranged on each of the multiple bridge regions, a pixel pitch between the pixels in the pixel unit in a stretching direction is a reference pitch $P_0$, a pitch between two adjacent pixel units in the stretching direction is a first pitch $P_1$, and the first pitch $P_1$ is less than the reference pitch $P_0$.

Optionally, a stretching deformation amount of each of the multiple bridge regions in the stretching direction is $\Delta P$, and the first pitch P1 is: $P_1 = P_0 - \Delta P$.

Optionally, the stretchable display region includes a uniform stretchable display region; in the uniform stretchable display region, the stretching deformation amount $\Delta P$ of each of the multiple bridge regions in the stretching direction is a fixed value and the first pitch $P_1$ is a fixed value.

Optionally, the stretching deformation amount $\Delta P \geq 3\% * P_0$.

Optionally, the stretchable display region includes a non-uniform stretchable display region; in the non-uniform stretchable display region, at least some of the multiple bridge regions have different stretching deformation amounts in the stretching direction; and in the non-uniform stretchable display region, the greater the stretching deformation amount of the bridge region, the smaller the first pitch $P_1$.

Optionally, the non-uniform stretchable display region in an unstretched state is a rectangular surface, and the non-uniform stretchable display region in a stretched state is a cambered surface stretched in an arc direction, the cambered surface includes a cambered surface starting end and a cambered surface vertex end, a stretching deformation amount of the cambered surface increases gradually from the cambered surface starting end to the cambered surface vertex end, and the first pitch $P_1$ decreases gradually from the cambered surface starting end to the cambered surface vertex end.

Optionally, the stretching deformation amount $\Delta P_n$ of the $n^{th}$ bridge region arranged in the first direction satisfies the following formula:

$$\Delta P_n = (R_n - L_n)/2 + (R_{n+1} - L_{n+1})/2,$$

the first direction is an extension direction of a straight edge of the rectangular surface which is tangent to the cambered surface starting end, L is a length of the island region in the first direction, R is a length of an arc corresponding to an orthographic projection of the island region onto the cambered surface, and n is an integer greater than or equal to 1.

Optionally, the pixel unit on each of the multiple island regions includes at least two pixels.

Optionally, a stretching deformation amount of the island region is pre-compensated according to the following formula: $P_0' = P_0 - \Delta P''$, where $\Delta P''$ is the stretching deformation amount of the island region.

Optionally, the pixel unit on each of the multiple the island regions includes at least four pixels, and each of the at least four pixels includes at least three sub-pixels.

A display device is also provided according to the present disclosure, including the display substrate as described above.

A method for manufacturing a display substrate is also provided according to the present disclosure, including:

providing a base substrate; and forming openings in the base substrate to form a non-stretchable display region and a stretchable display region, and forming pixels on the base substrate, the stretchable display region includes multiple island regions in an array and separated from each other, and multiple bridge regions connecting adjacent island regions, a pixel unit is arranged on each of the multiple island regions, the pixel unit includes at least one pixel, and a signal wire electrically connecting the pixels is arranged on each of the multiple bridge regions;

a pixel pitch between the pixels in the pixel unit in a stretching direction is a reference pitch $P_0$, a pitch between two adjacent pixel units in the stretching direction is a first pitch $P_1$, and the first pitch $P_1$ is less than the reference pitch $P_0$.

Optionally, in the method, the forming the pixels on the base substrate specifically includes:

predicting a stretching deformation amount $\Delta P$ of the stretchable display region, and determining the first pitch $P_1$ based on the stretching deformation amount $\Delta P$.

Optionally, in the method, the predicting the stretching deformation amount $\Delta P$ of the stretchable display region, and determining the first pitch $P_1$ based on the stretching deformation amount $\Delta P$ specifically includes:

determining a stretching deformation amount $\Delta P$ in the stretching direction for the bridge region; and determining the first pitch $P_1$ based on the following formula: $P_1 = P_0 - \Delta P$.

Optionally, in the method, the stretchable display region includes a uniform stretchable display region; in the uniform stretchable display region, the stretching deformation amount $\Delta P$ of each of the multiple bridge regions in the stretching direction is determined as a fixed value and the first pitch $P_1$ is determined as a fixed value.

Optionally, in the method, the stretchable display region includes a non-uniform stretchable display region; in the non-uniform stretchable display region, at least some of the multiple bridge regions have different stretching deformation amounts in the stretching direction; and in the non-uniform stretchable display region, the greater the stretching deformation amount of the bridge region, the smaller the first pitch $P_1$.

Optionally, the non-uniform stretchable display region in an unstretched state is a rectangular surface, and the non-uniform stretchable display region in a stretched state is a cambered surface stretched in an arc direction, the cambered surface includes a cambered surface starting end and a cambered surface vertex end, a stretching deformation amount of the cambered surface increases gradually from the cambered surface starting end to the cambered surface vertex end, and the first pitch $P_1$ decreases gradually from the cambered surface starting end to the cambered surface vertex end.

Optionally, in the method, in the non-uniform stretchable display region, the stretching deformation amount $\Delta P_n$ of the $n^{th}$ bridge region arranged in the first direction satisfies the following formula: $\Delta P_n = (R_n - L_n)/2 + (R_{n+1} - L_{n+1})/2$, the first direction is an extension direction of a straight edge of the rectangular surface which is tangent to the cambered surface starting end, L is a length of the island region in the first direction, R is a length of an arc corresponding to an orthographic projection of the island region onto the cambered surface, and n is an integer greater than or equal to 1.

DETAILED DESCRIPTION

Figure 1:
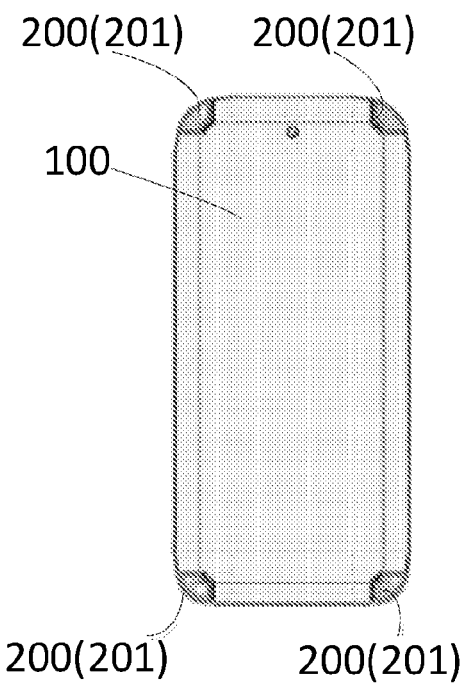
FIG. 1 is a schematic diagram showing an overall planar structure of a display substrate according to embodiments of the present disclosure.

To further clarify the objectives, technical solutions and advantages of the embodiments of the present disclosure, the technical solutions in the embodiments of the present disclosure will be clearly and completely described below in combination with the drawings in the present disclosure. It is apparent that the described embodiments are not all embodiments but part of embodiments of the present disclosure. All other embodiments obtained by those of ordinary skill in the art on the basis of the embodiments in the application without creative work shall fall within the scope of protection of the application.

Unless defined otherwise, technical or scientific terms used in the present disclosure should have the common meaning as understood by one of ordinary skill in the art to which the disclosure belongs. The terms such as "first", "second", and the like in this disclosure do not represent any order, quantity, or importance, but are just to distinguish different components. Likewise, terms such as "a", "an", or "the" and the like do not represent a limitation of quantity, but rather represent the presence of at least one of the referenced items. The word "comprises" or "includes", and the like, mean that the presence of an element or item preceding the word covers the presence of the element or item listed after the word and equivalents thereof, but does not exclude other elements or items. Terms such as "connect", "mutually connected" or similar words are not limited to physical or mechanical connection but may include electrical connection, either direct or indirect. The terms "upper", "lower", "left", "right" and the like are used only to indicate relative positional relationships that may change accordingly when the absolute position of the described object changes.

Before describing in detail the display substrate, the manufacturing method thereof, and the display device provided by the present disclosure, the related technologies need to be described.

In the related technologies, in order to increase the amount of deformability of a flexible display device, a flexible substrate is usually provided with a set of openings and it is divided into island regions where pixels are located and bridge regions where connecting lines are located, so that the display device has property of stretchability and deformability. The pixels are arranged on the island regions, and signal wires are arranged on the bridge regions, and when an external force is applied, the deformation mainly occurs in the bridge regions, and the pixels in the island regions basically maintain their shapes. For the flexible display device, a display screen includes a non-stretchable display region and a stretchable display region. Compared with the pixel design of the non-stretchable display region, pixels in the stretchable display region may be formed by removing a part of the pixels on the basis of the pixel design of the non-stretchable display region. For example, after the pixels at the corresponding openings are removed in the pixel arrangement of the non-stretchable display region, the pixel arrangement of the stretchable display region is formed. That is, when the stretchable display region is not subjected to stretching deformation, the pixel distribution thereof is uniform and consistent with the pixel distribution of the non-stretchable display region, and the display brightness is uniform; however, when stretching deformation occurs, uniformity of the pixel distribution is broken and the pixel density of the stretchable display region decreases, which results in a decrease in the brightness of the stretchable display region, thereby causing the luminous brightness of the entire stretchable display region to differ from the luminous brightness of the non-stretchable display region in the display panel. As a result, the display quality is adversely affected.

In view of the above-mentioned technical problem, embodiments of the present disclosure provide a display substrate, a manufacturing method thereof, and a display device, which can improve the phenomenon of luminance difference between the stretchable display region and the non-stretchable display region in the related technologies.

Figure 2:
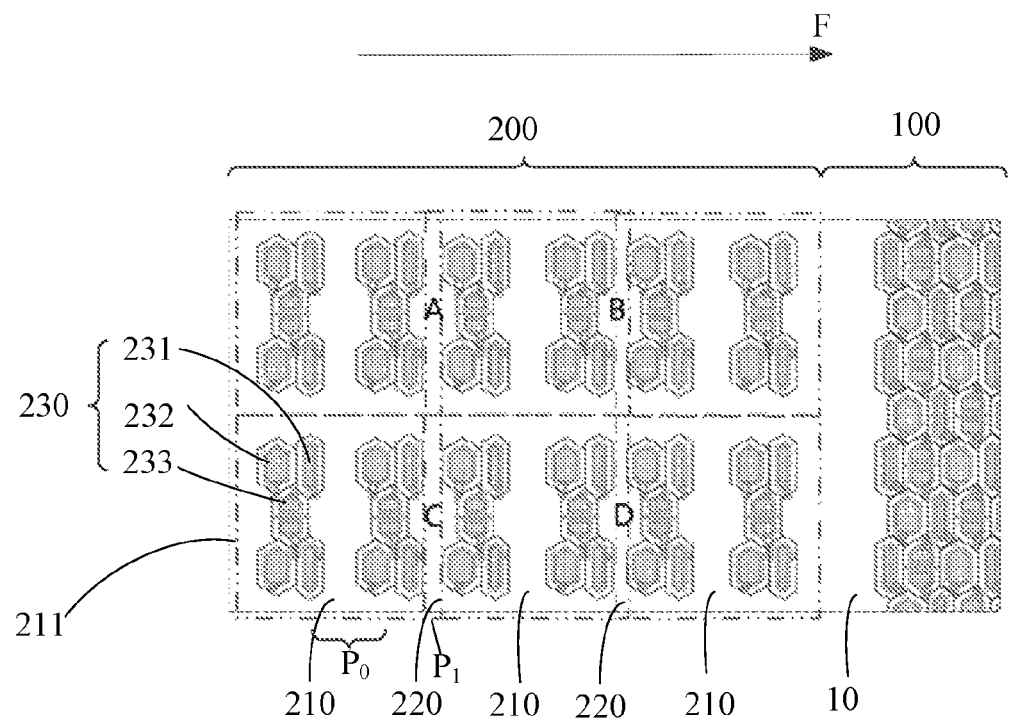
FIG. 2 is a schematic diagram of a partial structure of a display substrate according to embodiments of the present disclosure
Figure 3:
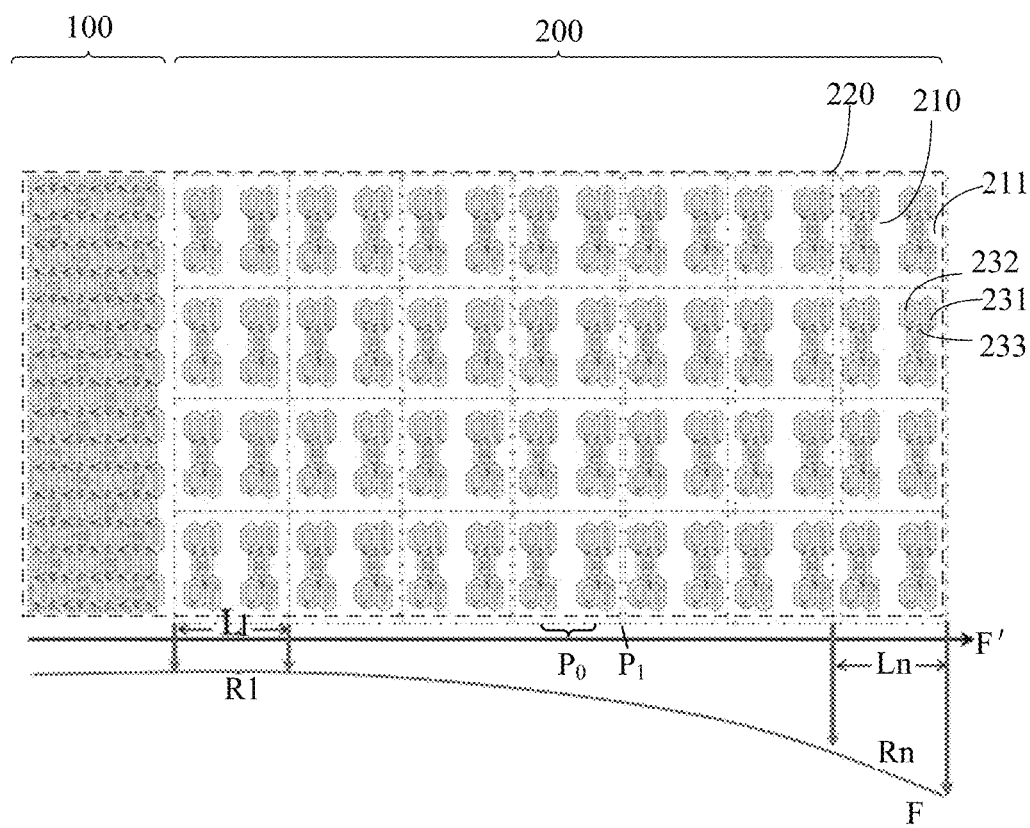
FIG. 3 is a schematic diagram of a partial structure of a display substrate according to another embodiment of the present disclosure.
Figure 4:
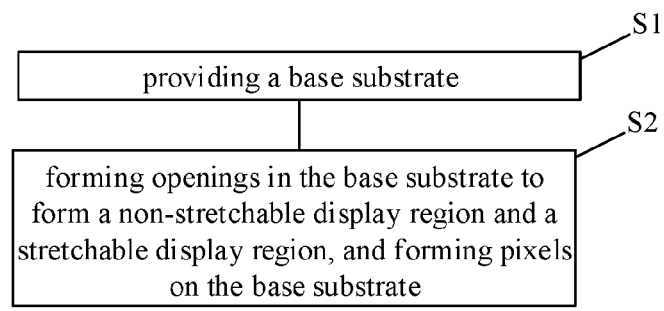
FIG. 4 is a flow chart showing a method for manufacturing a display substrate according to embodiments of the present disclosure.
Figure 5:
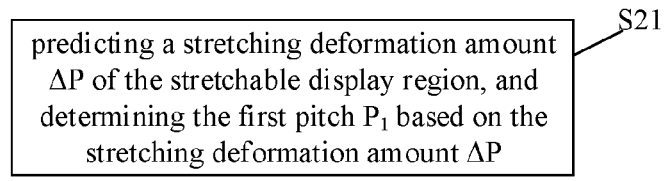
FIG. 5 is a flow chart showing the step S2 of the method for manufacturing the display substrate in FIGS. 4.
Figure 6:
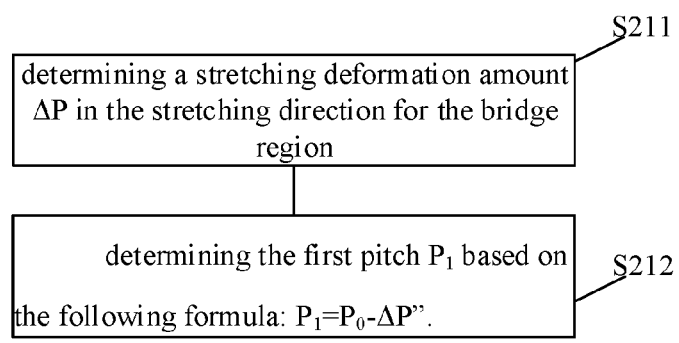
FIG. 6 is a flow chart showing the step S21 of the method for manufacturing the display substrate in FIG. 5.

As shown in FIGS. 1 to 3, the display substrate provided by the embodiments of the present disclosure includes:

a non-stretchable display region 100 and a stretchable display region 200. The stretchable display region 200 includes multiple island regions 210 distributed in an array and separated from each other, and multiple bridge regions 220 connecting adjacent island regions 210, a pixel unit 211 is arranged on each of the island regions 210, the pixel unit 211 includes at least one pixel 230, and a signal wire electrically connected to the pixels 230 is arranged on each of the bridge regions 220.

A pixel pitch between the pixels 230 in the pixel unit 211 in a stretching direction is a reference pitch $P_0$, a pitch between two adjacent pixel units 211 in the stretching direction is a first pitch $P_1$, and the first pitch $P_1$ is less than the reference pitch $P_0$.

In the above solution, the pixel design of the stretchable display region 200 is optimized, differential design is performed for the pixels of the stretchable display region 200 and the non-stretchable display region 100, and the pixel pitch between the pixel units 211 on the adjacent island regions 210 in the stretchable display region 200 is designed to be less than the reference pixel pitch $P_0$. In this way, the decrease in pixel density of the stretchable display region 200 caused due to stretching deformation is pre-compensated, so as to alleviate the problem of non-uniform display effect and difference in brightness that are caused by the difference in pixel density, improve the uniformity of display brightness and improve the product quality.

In some optional embodiments, the pixel density difference between the stretchable display region 200 and the non-stretchable display region 100 after stretching of the stretchable display region 200 is reduced, by predicting the stretching deformation amount of the stretchable display region 200 in advance and compensating the pixel pitch design of the stretchable display region 200 with the stretching deformation amount to achieve the desired pixel arrangement after stretching deformation. The display substrate provided by the embodiments of the present disclosure is optionally described below.

In some optional embodiments, in a stretching direction F, the stretchable display region 200 includes multiple bridge regions 220, the bridge region 220 has a stretching deformation amount $\Delta P$ in the stretching direction F, and the first pitch $P_1$ is: $P_1 = P_0 - \Delta P$.

In the above-mentioned solution, for the stretchable display region 200, the stretching deformation amount $\Delta P$ of the bridge region 220 is the stretching deformation amount in the stretching direction F between the pixel units 211 on the two adjacent island regions 210. After the stretching deformation amount $\Delta P$ is determined, the stretching deformation in the stretching direction F between the pixel units 211 on the two adjacent island regions 210 may be pre-compensated according to the stretching deformation amount $\Delta P$, and the difference between the reference pitch P0 and the stretching deformation amount $\Delta P$ is the first pitch P1. An example is as follows.

Taking FIG. 2 as an example, the pixels of the stretchable display region 200 are arranged in the island regions 210, the multiple island regions 210 are arranged in a uniform array, and bridge regions 220 are arranged at gaps in the array of island regions 210. Taking the four bridge regions 220 of A, B, C and D in FIG. 2 as an example, when a certain stretching deformation amount needs to be reached (for example, the stretching deformation amount $\Delta P$ reaches 3% or more), the area of the island region 210 and the bridge region 220 between the island regions 210 are deformed to a certain extent, and the deformation mainly occurs at the joint between the island regions 210, namely, the deformation mainly occurs at the bridge region 220. Thus, the pixel arrangement of the stretchable display region 200 is optimized to reduce the pixel pitch between island regions 210, i.e., the pitch between adjacent pixel units 211.

In general, the deformation amount of the stretchable display region of the stretchable screen is small, and in the scheme of the present disclosure, only positions of the pixel units of the overall stretchable display region relative to the normal non-stretchable display region may be changed. In some embodiments, the overall stretching deformation amount is relatively small, which is about 3%*$P_0$.

Taking the display substrate with an overall stretching deformation amount $\Delta P \geq 3\%*P_0$ shown in FIG. 2 as an example, the first pitch $P_1$ between the island region 210 and the island region 210 of the stretchable display region 200 is compensated for deformation, which is reduced to be less than or equal to 97%*$P_0$, for example, the reference pixel pitch $P_0$ is 129 μm, and the first pitch $P_1$=125 μm is reduced by about 3%. In this way, in the subsequent stretching deformation, the first pitch between the island regions 210 can be stretched to the reference pitch value in the uniformly arranged state, so as to meet the screen requirement of uniform brightness in the non-stretchable display region 100 and the stretchable display region 200.

As shown in FIG. 2, in some embodiments, the stretchable display region 200 includes a uniform stretchable display region 200 in which the stretching deformation amount $\Delta P$ of each of the bridge regions 220 in the stretching direction F is a fixed value and the first pitch $P_1$ is a fixed value. That is, the stretchable display region 200 may be the uniform stretchable display region 200 having the same stretching deformation amount at different positions, so that the first pitches $P_1$ between adjacent island regions 210 are also the same in the stretching direction F.

In some other optional embodiments, the stretchable display region 200 includes a non-uniform stretchable display region in which at least some of the bridge regions 220 have different amounts of stretching deformation in the stretching direction F, and in which the first pitch $P_1$ has a linear relationship with the corresponding amount of stretching deformation of the bridge region 220, the larger the amount of stretching deformation of the bridge region 220, the smaller the first pitch $P_1$.

In the above-mentioned solution, the stretchable display region 200 is the non-uniform stretchable display region, first pitches $P_1$ at corresponding positions are different according to different amounts of stretching deformation at different positions, and the greater the stretching deformation amount of the bridge region 220, the smaller the first pitch $P_1$ at the corresponding position.

It should be noted that in some embodiments, the stretchable display region 200 may include only the uniform stretchable display region, or may include only the non-uniform stretchable display region, or may include both the uniform stretchable display region and the non-uniform stretchable display region.

For example, in the display substrate provided in some embodiments, the stretchable display region 200 may be attached on some curved surfaces and is subjected to tensile stress. In FIG. 1, the display regions at four corners of the display substrate are subjected to tensile stress, and the other display regions are not subjected to tensile stress except for the display regions at the four corners. The stretchable display region 200 at the four corners may include a uniform stretchable display region and a non-uniform stretchable display region, and the region division of the uniform stretchable display region and the non-uniform stretchable display region may be obtained according to curved surface feature analysis in practical applications.

Further, in some optional embodiments, as shown in FIG. 3, the non-uniform stretchable display region in an unstretched state is a rectangular surface, and the non-uniform stretchable display region in a stretched state is a cambered surface stretched in an arc direction, the cambered surface includes a cambered surface starting end and a cambered surface vertex end, a stretching deformation amount of the cambered surface increases gradually from the cambered surface starting end to the cambered surface vertex end, and the first pitch $P_1$ decreases gradually from the cambered surface starting end to the cambered surface vertex end.

In the above-mentioned exemplary embodiments, the stretchable display region 200 is a region that needs to be attached to a cambered surface. For example, for the four corner regions shown in FIG. 1, the rectangular display region is stretched into a cambered surface, and the stretching direction F thereof is along the direction of the arc shown in FIG. 3. The cambered surface has the minimum stretching deformation amount on the side closer to the non-stretchable display region 100, which is the starting end of the cambered surface, and the cambered surface has the maximum stretching deformation amount on the side farther away from the non-stretchable display region 100, which is the vertex end of the cambered surface. The stretching deformation amount of the bridge region 220 gradually increases as the distance from the vertex end of the cambered surface decreases, in the direction indicated by the arrow F' in the figure; the stretching deformation amount of the bridge region 220 gradually increases in the direction F' indicated by the arrow, and accordingly, the first pitch P gradually decreases in the direction indicated by the arrow.

In the optional embodiments, the stretching deformation amount of the bridge region 220 may be determined according to the difference between the length L of each island region 210 and the arc length R corresponding to the orthographic projection of the island region 210 onto the cambered surface, which is specifically as follows:

the stretching deformation amount $\Delta P_n$ of the $n^{th}$ bridge region 220 arranged in the first direction satisfies the following formula:

$$\Delta P_n = (R_n - L_n)/2 + (R_{n+1} - L_{n+1})/2,$$

the first direction is an extension direction of a straight edge of the rectangular surface which is tangent to the starting end of the cambered surface, L is a length of the island region 210 in the first direction, R is a length of an arc corresponding to an orthographic projection of the island region 210 onto the cambered surface, and n is an integer greater than or equal to 1.

In the above-mentioned solution, in the stretchable display region 200, the difference between the length L of each island region 210 and its orthographic projection R onto the cambered surface varies according to the shape of the cambered surface. Hence, when designing the stretchable display region 200, this is reflected as the fact that the first pitch $P_1$ between the pixel units 211 of the island regions 210 needs to be pre-compensated for the difference between L and R. Taking a case where the first pitch $P_1$ corresponding to the second bridge region 220 is to be compensated as an example, the stretching deformation corresponding to the second bridge region 220 is $\Delta P_2 = (R_1 - L_1)/2 + (R_2 - L_2)/2$, where the difference between L and R may be obtained through actual measurement, or may be obtained through calculation when the equation of the section curve of the curved surface is known.

Further, in some optional embodiments, as shown in the figure, the pixel unit 211 on each of the island regions 210 include at least two pixels 230, and the pixel pitch between the pixels 230 in the same pixel unit 211 is the reference pitch $P_0$, and the reference pitch $P_0$ is greater than the first pitch $P_1$.

It can be understood that in practical applications, when the stretching deformation amount of the island region 210 reaches a certain deformation amount and hence a display brightness difference is formed with respect to the non-stretchable display region 100, which cannot be ignored, the reference pitch $P_0$ may be compensated according to the stretching deformation amount of the island region 210, for example, $P_0' = P_0 - \Delta P'''$, where $\Delta P'''$ is the stretching deformation amount of the island region 210.

Furthermore, in an optional embodiment, as shown in FIG. 2 or FIG. 3, the pixel unit 211 on each island region 210 includes at least four pixels 230, and each pixel 230 includes at least three sub-pixels. For example, each of the pixels 230 includes a red sub-pixel 231, a blue sub-pixel 232, and a green sub-pixel 233. It should be understood that the above description is intended to be illustrative, and not to be restrictive.

In addition, embodiments of the present disclosure also provide a display device including the display substrate provided by the embodiments of the present disclosure. Apparently, the display device provided by the embodiments of the present disclosure also has the advantageous effects brought about by the display substrate provided by the embodiments of the present disclosure, which is not repeated herein.

Furthermore, the display device may be various display devices such as a cellular phone, a computer, a tablet, a television, a display, etc.

Furthermore, embodiments of the present disclosure also provide a method for manufacturing a display substrate, and the method includes:

Step S1, providing a base substrate (10);

Step S2, form openings (201) in the base substrate to form a non-stretchable display region 100 and a stretchable display region 200, and forming pixels on the base substrate, where the stretchable display region 200 includes multiple island regions 210 distributed in an array and separated from each other, and multiple bridge regions 220 connecting adjacent island regions, a pixel unit 211 is arranged on each of island regions 210, the pixel unit 211 includes at least one pixel 230, and a signal wire electrically connected to the pixels 230 is arranged on each of the bridge regions 220.

A pixel pitch between the pixels 230 in the pixel unit 211 in a stretching direction is a reference pitch $P_0$, a pitch between two adjacent the pixel units 211 in the stretching direction is a first pitch $P_1$, and the first pitch $P_1$ is less than the reference pitch $P_0$.

In the above solution, the pixel design of the stretchable display region 200 is optimized, differential design is performed for the pixels of the stretchable display region 200 and the non-stretchable display region 100, and the pixel pitch between the pixel units 211 on the adjacent island regions 210 in the stretchable display region 200 is designed to be less than the reference pixel pitch. In this way, the decrease in pixel density of the stretchable display region 200 caused due to stretching deformation is pre-compensated, so as to alleviate the problem of non-uniform display effect and difference in brightness that are caused by the difference in pixel density, improve the uniformity of display brightness and improve the product quality.

Optionally, in the method, the above step S2 specifically includes:

Step S21, predicting a stretching deformation amount ΔP of the stretchable display region 200, and determining the first pitch $P_1$ according to the stretching deformation amount ΔP.

In the above-mentioned scheme, the pixel density difference between the stretchable display region 200 and the non-stretchable display region 100 after stretching of the stretchable display region 200 is reduced, by predicting the stretching deformation amount of the stretchable display region 200 in advance and compensating the pixel pitch design of the stretchable display region 200 with the stretching deformation amount to achieve the desired pixel arrangement after stretching deformation.

Optionally, in the method, step S21 specifically includes:

S211: the stretchable display region 200 includes multiple bridge regions 220 in the stretching direction F, the bridge region 220 has the stretching deformation amount ΔP in the stretching direction F, and S212: the first pitch P1 is determined as: P1=P0−ΔP.

In the above-mentioned solution, for the stretchable display region 200, the stretching deformation amount ΔP of the bridge region 220 is the stretching deformation amount in the stretching direction F between the pixel units 211 on the two adjacent island regions 210. After the stretching deformation amount ΔP is determined, the stretching deformation in the stretching direction F between the pixel units 211 on the two adjacent island regions 210 may be pre-compensated according to the stretching deformation amount ΔP, and the difference between the reference pitch P0 and the stretching deformation amount ΔP is the first pitch P1.

Optionally, in the method, step S21 specifically includes:

the stretchable display region 200 includes a uniform stretchable display region 200 in which the stretching deformation amount ΔP of each of the bridge regions 220 in the stretching direction F is determined as a fixed value and the first pitch $P_1$ is determined as a fixed value.

In the above-mentioned scheme, when forming the pixels, the stretchable display region 200 may be the uniform stretchable display region 200 having the same stretching deformation amount at different positions, so that the first pitches $P_1$ between adjacent island regions 210 are also the same in the stretching direction F.

Optionally, in the method, step S21 specifically includes:

the stretchable display region 200 includes a non-uniform stretchable display region in which at least some of the bridge regions 220 have different amounts of stretching deformation in the stretching direction F, and in which the first pitch $P_1$ is determined to have a linear relationship with the corresponding amount of stretching deformation of the bridge region 220, the larger the amount of stretching deformation of the bridge region 220, the smaller the first pitch $P_1$.

In the above-mentioned solution, for the non-uniform stretchable display region, first pitches $P_1$ at corresponding positions are different according to different amounts of stretching deformation at different positions, and the greater the stretching deformation amount of the bridge region 220, the smaller the first pitch $P_1$ at the corresponding position.

Optionally, the non-uniform stretchable display region in an unstretched state is a rectangular surface, and the non-uniform stretchable display region in a stretched state is a cambered surface stretched in an arc direction, the cambered surface includes a cambered surface starting end and a cambered surface vertex end, a stretching deformation amount of the cambered surface increases gradually from the cambered surface starting end to the cambered surface vertex end, and the first pitch $P_1$ decreases gradually from the cambered surface starting end to the cambered surface vertex end.

In the above-mentioned exemplary embodiments, the stretchable display region 200 is a region that needs to be attached to a cambered surface. For example, for the four corner regions shown in FIG. 1, the rectangular display region is stretched into a cambered surface, and the stretching direction F thereof is along the direction of the arc shown in FIG. 3. The cambered surface has the minimum stretching deformation amount on the side closer to the non-stretchable display region 100, which is the starting end of the cambered surface, and the cambered surface has the maximum stretching deformation amount on the side farther away from the non-stretchable display region 100, which is the vertex end of the cambered surface. The stretching deformation amount of the bridge region 220 gradually increases as the distance from the vertex end of the cambered surface decreases, in the direction indicated by the arrow F' in the figure; the stretching deformation amount of the bridge region 220 gradually increases in the direction indicated by the arrow F', and accordingly, the first pitch P gradually decreases in the direction indicated by the arrow.

Optionally, in the method, step S21 specifically includes:

in the non-uniform stretchable display region, the stretching deformation amount ΔP. of the $n^{th}$ bridge region 220 arranged in the first direction satisfies the following formula:

$$\Delta P_n = (R_n - L_n)/2 + (R_{n+1} - L_{n+1})/2,$$

the first direction is an extension direction of a straight edge of the rectangular surface which is tangent to the starting end of the cambered surface, L is a length of the island region 210 in the first direction, R is a length of an arc corresponding to an orthographic projection of the island region 210 onto the cambered surface, and n is an integer greater than or equal to 1.

In the optional embodiments, the stretching deformation amount of the bridge region 220 may be determined according to the difference between the length L of each island region 210 and the arc length R corresponding to the orthographic projection of the island region 210 onto the cambered surface. The difference between L and R may be obtained through actual measurement, or may be obtained through calculation when the equation of the section curve of the curved surface is known.

It can be understood that when an element such as a layer, film, region or substrate is referred to as being "above" or "below" another element, it may be directly above or below the another element or there may be an intervening element.

In the description of the embodiments above, particular features, structures, materials, or characteristics may be combined in any suitable manner in any one or more embodiments or examples.

The above embodiments are merely specific implementation of the present disclosure, but the scope of protection of the present disclosure is not limited thereto. Any modification or substitution that is apparent to those skilled in the art without departing from the technical scope of the present disclosure shall fall within the scope of protection of the present disclosure. Therefore, the scope of protection of the present disclosure shall be defined by the scope of protection of the claims.

What is claimed is:

1. A display substrate, comprising a non-stretchable display region and a stretchable display region;
   wherein the stretchable display region comprises a plurality of island regions in an array and separated from each other, and a plurality of bridge regions connecting adjacent island regions, a pixel unit is arranged on each of the plurality of island regions, the pixel unit comprises at least one pixel,
   wherein a pixel pitch between the pixels in the pixel unit in a stretching direction is a reference pitch P0, a pitch between two adjacent pixel units in the stretching direction is a first pitch P1, and the first pitch P1 is less than the reference pitch P0.

2. The display substrate according to claim 1, wherein a stretching deformation amount of each of the plurality of bridge regions in the stretching direction is $\Delta P$, and the first pitch P1 is: $P1=P0-\Delta P$.

3. The display substrate according to claim 2, wherein the stretchable display region comprises a uniform stretchable display region; in the uniform stretchable display region, the stretching deformation amount $\Delta P$ of each of the plurality of bridge regions in the stretching direction is a fixed value and the first pitch P1 is a fixed value.

4. The display substrate according to claim 3, wherein the stretching deformation amount $\Delta P \geq 3\% * P0$.

5. The display substrate according to claim 1, wherein the stretchable display region comprises a non-uniform stretchable display region; in the non-uniform stretchable display region, at least some of the plurality of bridge regions have different stretching deformation amounts in the stretching direction; and in the non-uniform stretchable display region, the greater the stretching deformation amount of the bridge region, the smaller the first pitch P1.

6. The display substrate according to claim 5, wherein the non-uniform stretchable display region in an unstretched state is a rectangular surface, and the non-uniform stretchable display region in a stretched state is a cambered surface stretched in an arc direction, the cambered surface comprises a cambered surface starting end and a cambered surface vertex end, a stretching deformation amount of the cambered surface increases gradually from the cambered surface starting end to the cambered surface vertex end, and the first pitch P1 decreases gradually from the cambered surface starting end to the cambered surface vertex end.

7. The display substrate according to claim 6, wherein the stretching deformation amount $\Delta Pn$ of the nth bridge region arranged in a first direction satisfies the following formula:

$$\Delta Pn=(Rn-Ln)/2+(Rn+1-Ln+1)/2,$$

wherein the first direction is an extension direction of a straight edge of the rectangular surface which is tangent to the cambered surface starting end, L is a length of the island region in the first direction, R is a length of an arc corresponding to an orthographic projection of the island region onto the cambered surface, and n is an integer greater than or equal to 1.

8. The display substrate according to claim 7, wherein the pixel unit on each of the plurality of island regions comprises at least two pixels.

9. The display substrate according to claim 8, wherein a stretching deformation amount of the island region is pre-compensated according to the following formula:
   $P0'=P0-\Delta P''$, wherein $\Delta P''$ is the stretching deformation amount of the island region.

10. The display substrate according to claim 8, wherein the pixel unit on each of the plurality of the island regions comprises at least four pixels, and each of the at least four pixels comprises at least three sub-pixels.

11. A display device, comprising a display substrate;
    wherein the display substrate comprises a non-stretchable display region and a stretchable display region;
    wherein the stretchable display region comprises a plurality of island regions in an array and separated from each other, and a plurality of bridge regions connecting adjacent island regions, a pixel unit is arranged on each of the plurality of island regions, the pixel unit comprises at least one pixel,
    wherein a pixel pitch between the pixels in the pixel unit in a stretching direction is a reference pitch P0, a pitch between two adjacent pixel units in the stretching direction is a first pitch P1, and the first pitch P1 is less than the reference pitch P0.

12. The display device according to claim 11, wherein a stretching deformation amount of each of the plurality of bridge regions in the stretching direction is $\Delta P$, and the first pitch P1 is: $P1=P0-\Delta P$.

13. The display device according to claim 12, wherein the stretchable display region comprises a uniform stretchable display region; in the uniform stretchable display region, the stretching deformation amount $\Delta P$ of each of the plurality of bridge regions in the stretching direction is a fixed value and the first pitch P1 is a fixed value.

14. A method for manufacturing a display substrate, comprising:
    providing a base substrate; and
    forming openings in the base substrate to form a non-stretchable display region and a stretchable display region, and forming pixels on the base substrate,
    wherein the stretchable display region comprises a plurality of island regions in an array and separated from each other, and a plurality of bridge regions connecting adjacent island regions, a pixel unit is arranged on each of the plurality of island regions, the pixel unit comprises at least one pixel, wherein a pixel pitch between the pixels in the pixel unit in a stretching direction is a reference pitch P0, a pitch between two adjacent pixel units in the stretching direction is a first pitch P1, and the first pitch P1 is less than the reference pitch P0.

15. The method according to claim 14, wherein the forming the pixels on the base substrate comprises:
predicting a stretching deformation amount $\Delta P$ of the stretchable display region, and determining the first pitch P1 based on the stretching deformation amount $\Delta P$.

16. The method according to claim 15, wherein the predicting the stretching deformation amount $\Delta P$ of the stretchable display region, and determining the first pitch P1 based on the stretching deformation amount $\Delta P$ comprises:
determining a stretching deformation amount $\Delta P$ in the stretching direction for the bridge region; and
determining the first pitch P1 based on the following formula:

$$P1=0-\Delta P.$$

17. The method according to claim 16, wherein the stretchable display region comprises a uniform stretchable display region; in the uniform stretchable display region, the stretching deformation amount $\Delta P$ of each of the plurality of bridge regions in the stretching direction is a fixed value and the first pitch P1 is a fixed value.

18. The method according to claim 15, wherein the stretchable display region comprises a non-uniform stretchable display region; in the non-uniform stretchable display region, at least some of the plurality of bridge regions have different stretching deformation amounts in the stretching direction; and in the non-uniform stretchable display region, the greater the stretching deformation amount of the bridge region, the smaller the first pitch P1.

19. The method according to claim 18, wherein the non-uniform stretchable display region in an unstretched state is a rectangular surface, and the non-uniform stretchable display region in a stretched state is a cambered surface stretched in an arc direction, the cambered surface comprises a cambered surface starting end and a cambered surface vertex end, a stretching deformation amount of the cambered surface increases gradually from the cambered surface starting end to the cambered surface vertex end, and the first pitch P1 decreases gradually from the cambered surface starting end to the cambered surface vertex end.

20. The method according to claim 19, wherein in the non-uniform stretchable display region, the stretching deformation amount $\Delta Pn$ of the nth bridge region arranged in a first direction satisfies the following formula:

$$\Delta Pn=(Rn-Ln)/2+(Rn+1-Ln+1)/2,$$

wherein the first direction is an extension direction of a straight edge of the rectangular surface which is tangent to the cambered surface starting end, L is a length of the island region in the first direction, R is a length of an arc corresponding to an orthographic projection of the island region onto the cambered surface, and n is an integer greater than or equal to 1.

* * * * *